(12) United States Patent
Shimazu et al.

(10) Patent No.: US 9,527,472 B2
(45) Date of Patent: Dec. 27, 2016

(54) LIFT-UP BUCKLE DEVICE

(71) Applicants: TOYOTA JIDOSHA KABUSHIKI KAISHA, Toyota-shi, Aichi-ken (JP); KABUSHIKI KAISHA TOKAI-RIKA-DENKI-SEISAKUSHO, Niwa-gun, Aichi-ken (JP)

(72) Inventors: Katsuya Shimazu, Toyota (JP); Makoto Matsuzaki, Niwa-gun (JP)

(73) Assignees: TOYOTA JIDOSHA KABUSHIKI KAISHA, Toyota (JP); KABUSHIKI KAISHA TOKAI-RIKA-DENKI-SEISAKUSHO, Niwa-Gun (JP)

( * ) Notice: Subject to any disclaimer, the term of this patent is extended or adjusted under 35 U.S.C. 154(b) by 0 days.

(21) Appl. No.: 14/793,486

(22) Filed: Jul. 7, 2015

(65) Prior Publication Data

US 2016/0031411 A1    Feb. 4, 2016

(30) Foreign Application Priority Data

Jul. 30, 2014  (JP) .................. 2014-155438

(51) Int. Cl.
| | |
|---|---|
| B60R 22/03 | (2006.01) |
| B60R 21/00 | (2006.01) |
| A62B 35/00 | (2006.01) |
| A62B 35/04 | (2006.01) |
| B60R 22/20 | (2006.01) |
| B60R 22/26 | (2006.01) |
| B60R 22/18 | (2006.01) |

(52) U.S. Cl.
CPC .............. *B60R 22/20* (2013.01); *B60R 22/03* (2013.01); *B60R 22/26* (2013.01); *B60R 2022/1806* (2013.01); *B60R 2022/1812* (2013.01); *B60R 2022/207* (2013.01)

(58) Field of Classification Search
CPC ........... B60R 22/03; B60R 22/20; B60R 22/26
USPC ............................ 297/481, 482; 280/801.1
See application file for complete search history.

(56) References Cited

U.S. PATENT DOCUMENTS

| | | | | |
|---|---|---|---|---|
| 4,248,480 A | * | 2/1981 | Koucky | ............... B60N 2/0825 248/393 |
| 4,487,454 A | * | 12/1984 | Biller | ..................... B60R 22/26 248/420 |

(Continued)

FOREIGN PATENT DOCUMENTS

| | | |
|---|---|---|
| JP | S63-154358 U | 10/1988 |
| JP | H04-353054 A | 12/1992 |
| JP | H05-14927 Y2 | 4/1993 |

*Primary Examiner* — Rodney B White
(74) *Attorney, Agent, or Firm* — Oliff PLC (57) ABSTRACT

A lift-up buckle device including a buckle; a lift-up device that includes a coupling portion coupled to the buckle and that moves the buckle from a stowed position to a raised position; a first cover fixed to the lift-up device to cover the coupling portion; and a second cover through which the first cover is inserted, that moves together with the buckle toward a seat upper side. When the buckle is positioned in the raised position, a seat lower side end of the second cover is positioned further toward the lift-up device side than a seat upper side end of the first cover, and an end of the second cover on a seat width direction outside and seat lower side is positioned further toward the lift-up device side than an end of the second cover on a seat width direction inside and seat lower side.

6 Claims, 10 Drawing Sheets

(56) References Cited

U.S. PATENT DOCUMENTS

| | | | |
|---|---|---|---|
| 4,763,924 A * | 8/1988 | Karlin | B60R 22/26 280/806 |
| 4,790,597 A * | 12/1988 | Bauer | B60R 22/26 248/429 |
| 4,923,214 A * | 5/1990 | Siegrist | B60R 22/26 280/801.1 |
| 5,064,220 A * | 11/1991 | Ogawa | B60R 22/26 180/268 |
| 5,098,162 A | 3/1992 | Forget et al. | |
| 5,226,697 A * | 7/1993 | Borlinghaus | B60R 22/26 297/216.18 |
| 5,236,220 A * | 8/1993 | Mills | B60R 22/22 280/801.1 |
| 5,332,261 A * | 7/1994 | Siepierski | B60R 22/22 280/801.1 |
| 5,927,756 A * | 7/1999 | Wier | B60R 22/1951 280/806 |
| 6,092,875 A * | 7/2000 | Pleyer | B60R 22/18 280/801.1 |
| 6,131,951 A * | 10/2000 | Chicken | B60R 22/1952 280/806 |
| 6,299,211 B1 * | 10/2001 | Wier | B60R 22/1952 280/741 |
| 6,467,849 B1 * | 10/2002 | Deptolla | B60R 22/26 297/216.1 |
| 6,581,969 B2 * | 6/2003 | Nishide | B60R 22/22 280/801.1 |
| 6,883,834 B2 * | 4/2005 | Grabowski | B60R 22/03 280/801.2 |
| 6,902,195 B2 * | 6/2005 | Ball | B60R 22/1955 280/806 |
| 6,932,324 B2 * | 8/2005 | Biller | B60R 22/1952 254/230 |
| 6,976,707 B2 * | 12/2005 | Modinger | B60R 22/1952 280/806 |
| 7,178,835 B2 * | 2/2007 | Hippel | B60R 22/03 280/806 |
| 7,188,868 B2 * | 3/2007 | Yamaguchi | B60R 22/195 280/806 |
| 7,383,620 B2 * | 6/2008 | Smith | A44B 11/2553 24/265 EC |
| 7,407,193 B2 * | 8/2008 | Yamaguchi | B60R 22/03 280/801.1 |
| 7,490,857 B2 * | 2/2009 | Tomita | B60R 22/1952 280/806 |
| 7,527,332 B2 * | 5/2009 | Sakai | B60N 2/1615 297/216.1 |
| 7,722,081 B2 * | 5/2010 | Van Druff | B60R 22/30 24/579.11 |
| 7,828,332 B2 * | 11/2010 | Bok | B60R 22/1952 180/268 |
| 7,914,045 B2 * | 3/2011 | Messner | B60R 22/12 280/801.1 |
| 7,967,339 B2 * | 6/2011 | Usoro | B60R 22/03 180/268 |
| 8,196,961 B2 * | 6/2012 | Lane, Jr. | B60R 22/1952 280/806 |
| 8,317,228 B2 * | 11/2012 | Mages | B60R 22/1951 280/806 |
| 8,585,090 B2 * | 11/2013 | Lane, Jr. | B60R 22/1952 280/806 |
| 8,684,469 B2 * | 4/2014 | Fukuzawa | B60R 22/26 297/468 |
| 8,777,268 B2 * | 7/2014 | Holbein | B60R 22/03 280/805 |
| 9,283,926 B2 * | 3/2016 | Thomas | B60N 2/16 |
| 2004/0217583 A1 * | 11/2004 | Wang | B60R 22/03 280/805 |
| 2005/0224270 A1 * | 10/2005 | Holbein | B60R 22/03 180/268 |
| 2006/0231317 A1 * | 10/2006 | Yamaguchi | B60R 22/03 180/268 |
| 2006/0279077 A1 * | 12/2006 | Nakano | B60R 22/1952 280/806 |
| 2010/0066151 A1 * | 3/2010 | Usoro | B60R 22/03 297/481 |
| 2014/0132056 A1 * | 5/2014 | Yilma | B60R 22/20 297/481 |

* cited by examiner

LIFT-UP BUCKLE DEVICE

CROSS-REFERENCE TO RELATED APPLICATION

This application is based on and claims priority under 35 USC 119 from Japanese Patent Application No. 2014-155438 filed on Jul. 30, 2014, the disclosure of which is incorporated by reference herein.

BACKGROUND

Technical Field

The present invention relates to a lift-up buckle device.

Related Art

Japanese Utility Model Application Laid-Open (JP-U) No. S63-154358 describes a buckle device that engages with a tongue through which webbing is inserted. The buckle device is fixed to a vehicle body through an anchor plate and a coupling belt, and the coupling belt is covered by a first belt cover and a second belt cover. One end portion of the second belt cover is inserted into (fitted together with) one end portion of the first belt cover, thus enabling the first belt cover to move relative to the second belt cover, and enabling the buckle device to be moved (lifted up) toward a seat upper side.

However, in the buckle device (lift-up buckle device) described in JP-U No. S63-154358, it is conceivable that the coupling belt could be visible between the first belt cover and the second belt cover if an occupant pulls or tilts the buckle device when the occupant puts on the webbing. Namely, it is conceivable that the appearance of the lift-up buckle device could be detrimentally affected.

SUMMARY

In consideration of the above circumstances, an object of the present invention is to obtain a lift-up buckle device capable of suppressing a detrimental effect on appearance.

A lift-up buckle device of a first aspect of the present invention includes: a buckle that engages with a tongue inserted with webbing worn by an occupant; a lift-up device that includes a coupling portion coupled to the buckle and that moves the buckle from a stowed position to a raised position; a first cover that is fixed to the lift-up device and covers the coupling portion; and a second cover through which the first cover is inserted, that moves together with the buckle toward a seat upper side by sliding with respect to the first cover, wherein, in a state in which the buckle is positioned in the raised position, a seat lower side end of the second cover is positioned further toward the lift-up device side than a seat upper side end of the first cover, and an end of the second cover on a seat width direction outside and seat lower side is positioned further toward the lift-up device side than an end of the second cover on a seat width direction inside and seat lower side.

In the lift-up buckle device of the first aspect of the present invention, when the occupant engages the tongue with the buckle, namely when the occupant puts on the webbing, the lift-up device operates, and the coupling portion of the lift-up device moves the buckle from the stowed position to the raised position. The occupant can thereby easily engage the tongue with the buckle.

In the present lift-up buckle device, the second cover, into which the first cover is inserted, moves together with the buckle on operation of the lift-up device. In the state in which the buckle is positioned in the raised position, the seat lower side end of the second cover is positioned further toward the lift-up device side than the seat upper side end of the first cover. This suppresses the coupling portion from being visible between the first cover and the second cover.

Furthermore, the end of the second cover on the seat width direction outside and seat lower side is positioned further toward the lift-up device side than the end of the second cover on the seat width direction inside and seat lower side, such that the second cover is suppressed from coming away from the first cover (the first cover is suppressed from coming out of the second cover) if the occupant tilts the buckle toward the seat width direction inside. Namely, in the present lift-up buckle device, the coupling portion is suppressed from being visible between the first cover and the second cover if the occupant tilts the buckle toward the seat width direction inside.

A lift-up buckle device of a second aspect of the present invention is the lift-up buckle device of the first aspect, wherein in the state in which the buckle is positioned in the raised position, an end of the second cover on a seat rear side and seat lower side is positioned further toward the lift-up device side than an end of the second cover on a seat front side and seat lower side.

In the lift-up buckle device of the second aspect of the present invention, in the state in which the buckle is positioned in the raised position, the position of the end of the second cover on the seat rear side and seat lower side and the position of the end of the second cover on the seat front side and seat lower side are set as described above, such that the second cover is suppressed from coming away from the first cover (the first cover is suppressed from coming out of the second cover) if the occupant tilts the buckle toward the seat front side. Namely, in the present lift-up buckle device, the coupling portion is suppressed from being visible between the first cover and the second cover if the occupant tilts the buckle toward the seat front side.

A lift-up buckle device of a third aspect of the present invention is the lift-up buckle device of the first aspect or the second aspect, wherein in a state in which the buckle is positioned in the stowed position, an end portion of the second cover on the seat width direction outside and seat lower side and an end of the first cover seat on the width direction outside and seat lower side overlap with each other in the seat width direction.

In the lift-up buckle device of the third aspect of the present invention, in the state in which the buckle is positioned in the stowed position, the end portion of the second cover on the seat width direction outside and seat lower side covers the end of the first cover seat on the width direction outside and seat lower side. A boundary portion between the first cover and the lift-up device is thereby suppressed from being visible from the seat width direction outside.

A lift-up buckle device of a fourth aspect of the present invention is the lift-up buckle device of any one of the first aspect to the third aspect, wherein the rigidity of a location at the seat lower side of the first cover is set lower than the rigidity of a location at the seat upper side of the first cover.

In the lift-up buckle device of the fourth aspect of the present invention, the rigidity of the location at the seat lower side of the first cover and the rigidity of the location at the seat upper side of the first cover are set as described above, thereby enabling the first cover to be both self-supporting and flexible.

A lift-up buckle device of a fifth aspect of the present invention includes: a buckle that engages with a tongue inserted with webbing worn by an occupant; a lift-up device that includes a coupling portion coupled to the buckle and that moves the buckle from a stowed position to a raised position; a first cover that is fixed to the lift-up device and covers the coupling portion, wherein an end of the first cover on a seat width direction outside and seat upper side is positioned further toward the buckle side than an end of the first cover on a seat width direction inside and seat upper side; and a second cover through which the first cover is inserted, that moves together with the buckle toward a seat upper side by sliding with respect to the first cover, wherein, in a state in which the buckle is positioned in the raised position, a seat lower side end of the second cover is positioned further toward the lift-up device side than a seat upper side end of the first cover.

In the lift-up buckle device of the fifth aspect of the present invention, in the state in which the buckle is positioned in the raised position, the seat lower side end of the second cover is positioned further toward the lift-up device side than the seat upper side end of the first cover. The coupling portion is thereby suppressed from being visible between the first cover and the second cover.

Moreover, the end of the first cover on the seat width direction outside and seat upper side is positioned further toward the buckle side than the end of the first cover on the seat width direction inside and seat upper side, such that the second cover is suppressed from coming away from the first cover (the first cover is suppressed from coming out of the second cover) if the occupant tilts the buckle toward the seat width direction inside. Namely, in the present lift-up buckle device, the coupling portion is suppressed from being visible between the first cover and the second cover if the occupant tilts the buckle toward the seat width direction inside.

A lift-up buckle device of a sixth aspect of the present invention is the lift-up buckle device of the fifth aspect, wherein an end of the first cover on the seat rear side and seat upper side is positioned further toward the buckle side than an end of the first cover on the seat front side and seat upper side.

In the lift-up buckle device of the sixth aspect of the present invention, in the state in which the buckle is positioned in the raised position, the position of the end of the first cover on the seat rear side and seat upper side and the position of the end of the first cover on the seat front side and seat upper side are set as described above, such that the second cover is suppressed from coming away from the first cover (the first cover is suppressed from coming out of the second cover) if the occupant tilts the buckle toward the seat front side. Namely, in the present lift-up buckle device, the coupling portion is suppressed from being visible between the first cover and the second cover if the occupant tilts the buckle toward the seat front side.

The lift-up buckle device according to the present invention has an excellent advantageous effect of enabling a detrimental effect on appearance to be suppressed.

BRIEF DESCRIPTION OF THE DRAWINGS

Exemplary embodiments of the present invention will be described in detail based on the following figures, wherein.

DETAILED DESCRIPTION

Explanation follows regarding a lift-up buckle device according to an exemplary embodiment of the present invention, with reference to FIG. 1 to FIG. 8. Note that in the below explanation, explanation referring to the front-rear, left-right, and up-down directions refers to the front-rear, left-right, and up-down directions as viewed by an occupant seated in a vehicle seat. Moreover, in each of the drawings as appropriate, the arrow FR indicates the front direction, the arrow UP indicates the upward direction, and the arrow OUT indicates the seat width direction outside.

Figure 1:
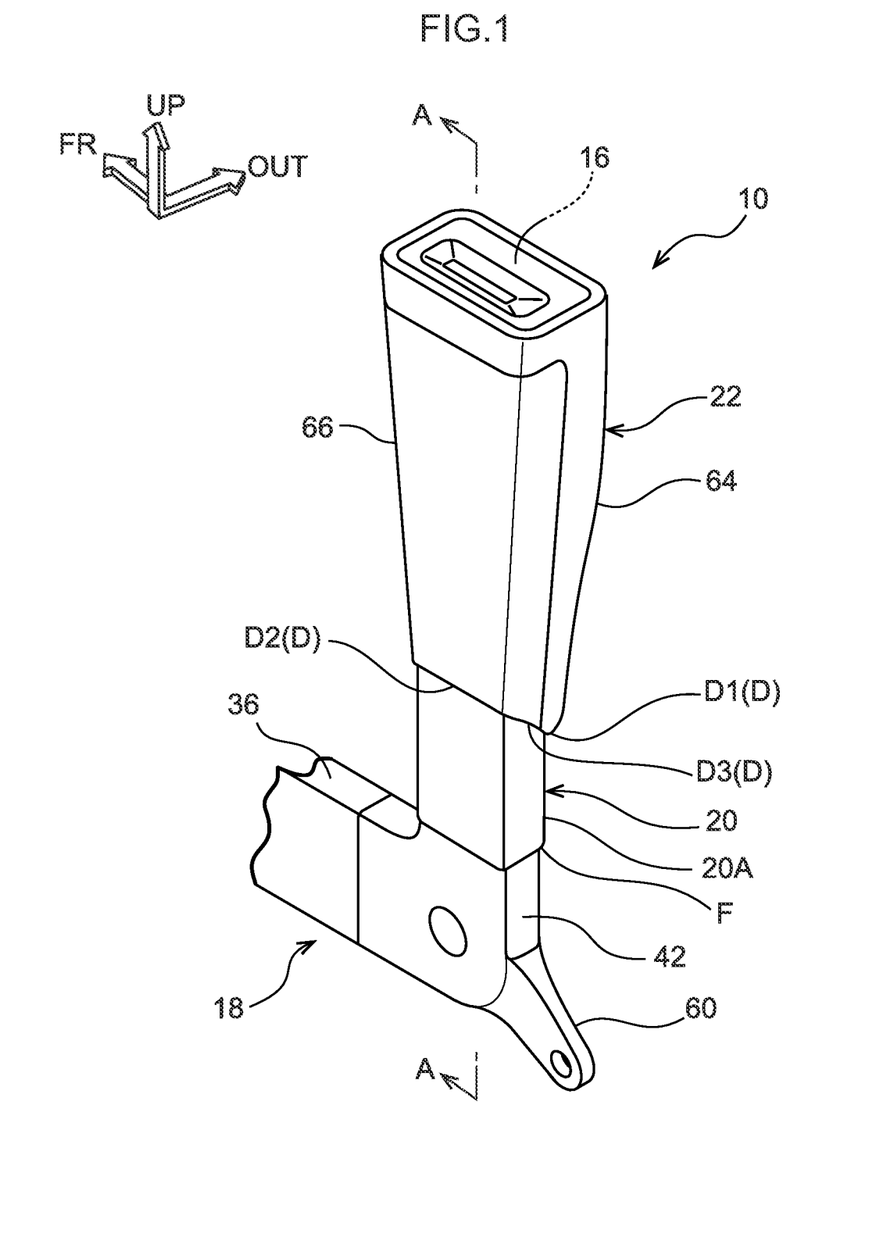
FIG. 1 is an enlarged perspective view illustrating an enlarged portion of a lift-up buckle device of an exemplary embodiment.
Figure 2:
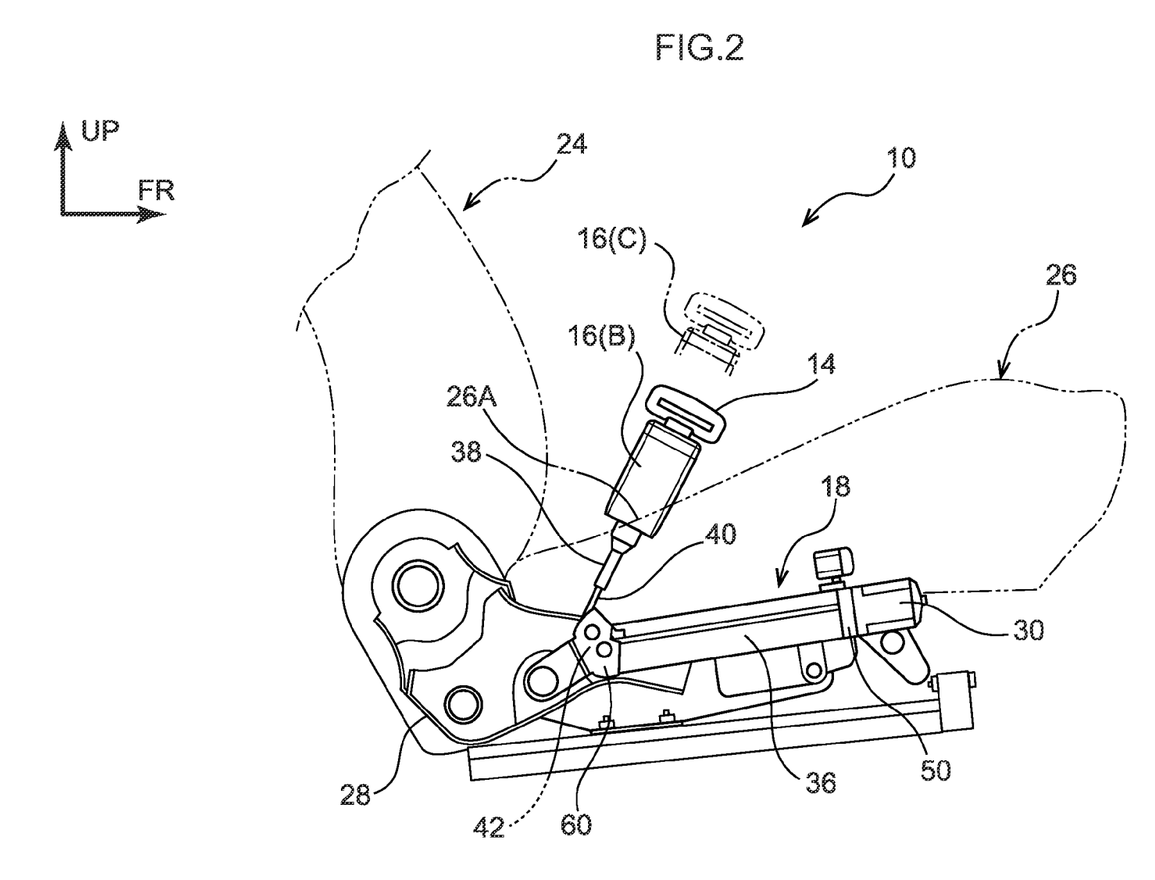
FIG. 2 is a side view illustrating a vehicle seat and a lift-up buckle device attached to a seat cushion frame.

As illustrated in FIG. 1, a lift-up buckle device 10 of the present exemplary embodiment includes a buckle 16 which engages with a tongue 14 through which webbing 12 worn by the occupant is inserted (see FIG. 5), a lift-up device 18 that moves a buckle from a stowed position to a raised position, a first cover 20 fixed to the lift-up device 18, and a second cover 22 into which the first cover 20 is inserted, and which moves together with the buckle 16 toward the seat upper side by sliding with respect to the first cover 20. As illustrated in FIG. 2, the lift-up buckle device 10 is fixed to a seat cushion frame 28 configuring a frame of a seat cushion 26 of a vehicle seat 24. When the occupant is sitting on the seat cushion 26, the occupant can engage the tongue 14 with the buckle 16 due to movement of the buckle 16 from a stowed position B to a raised position C. Explanation first follows regarding configuration of the buckle 16, followed by explanation regarding the lift-up device 18, and finally explanation regarding configurations of the first cover 20 and the second cover 22, these being relevant portions of the present exemplary embodiment.

(Buckle 16)

The buckle 16 is a conventional type including an engagement portion, not illustrated in the drawings, to engage with the tongue 14, and a release operation portion, not illustrated in the drawings, to release this engagement. A wire 40, described later, is fixed to the buckle 16 through a joint piece 38.

(Lift-Up Device 18)

Figure 3:
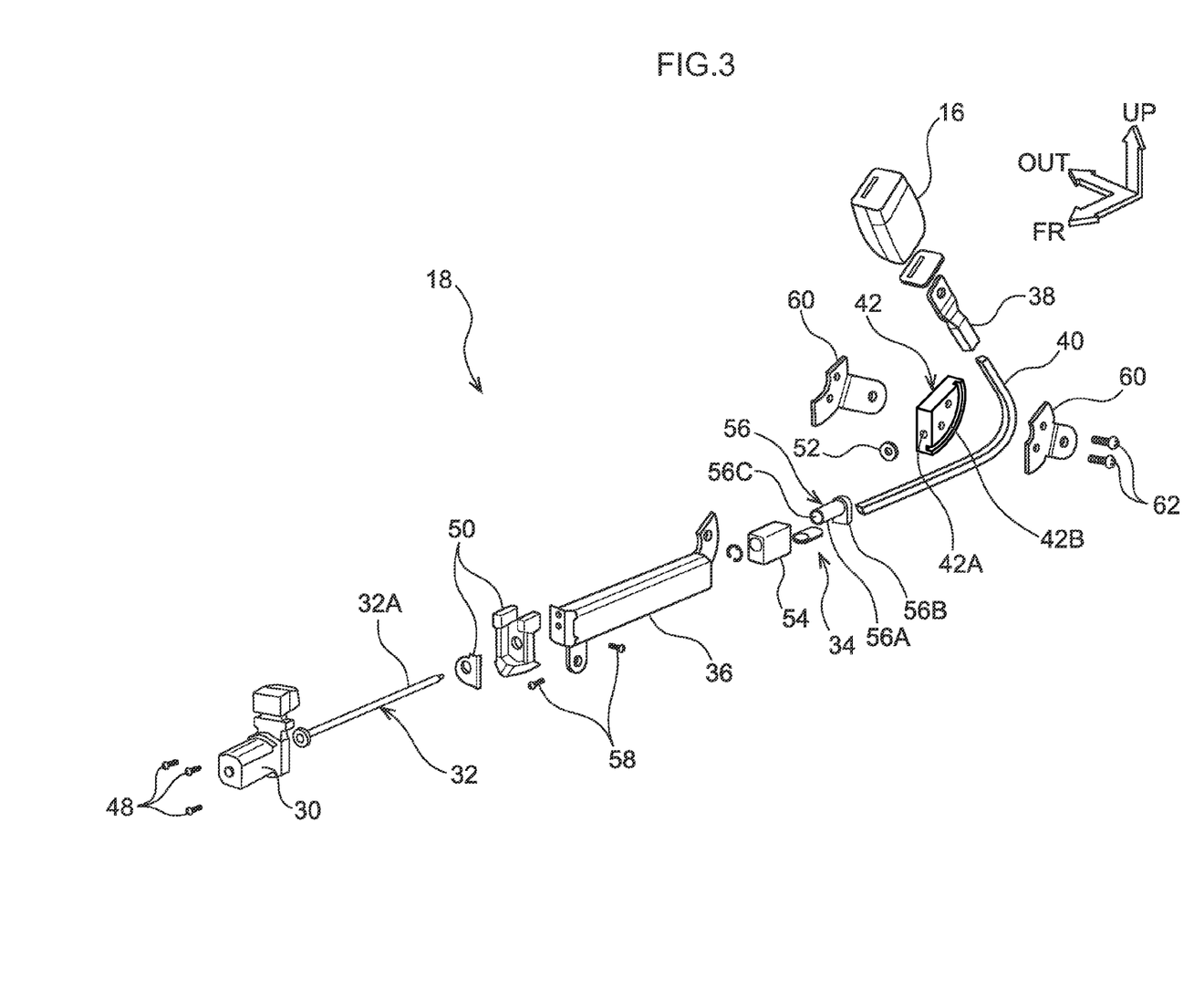
FIG. 3 is an exploded perspective view illustrating a lift-up device.
Figure 4:
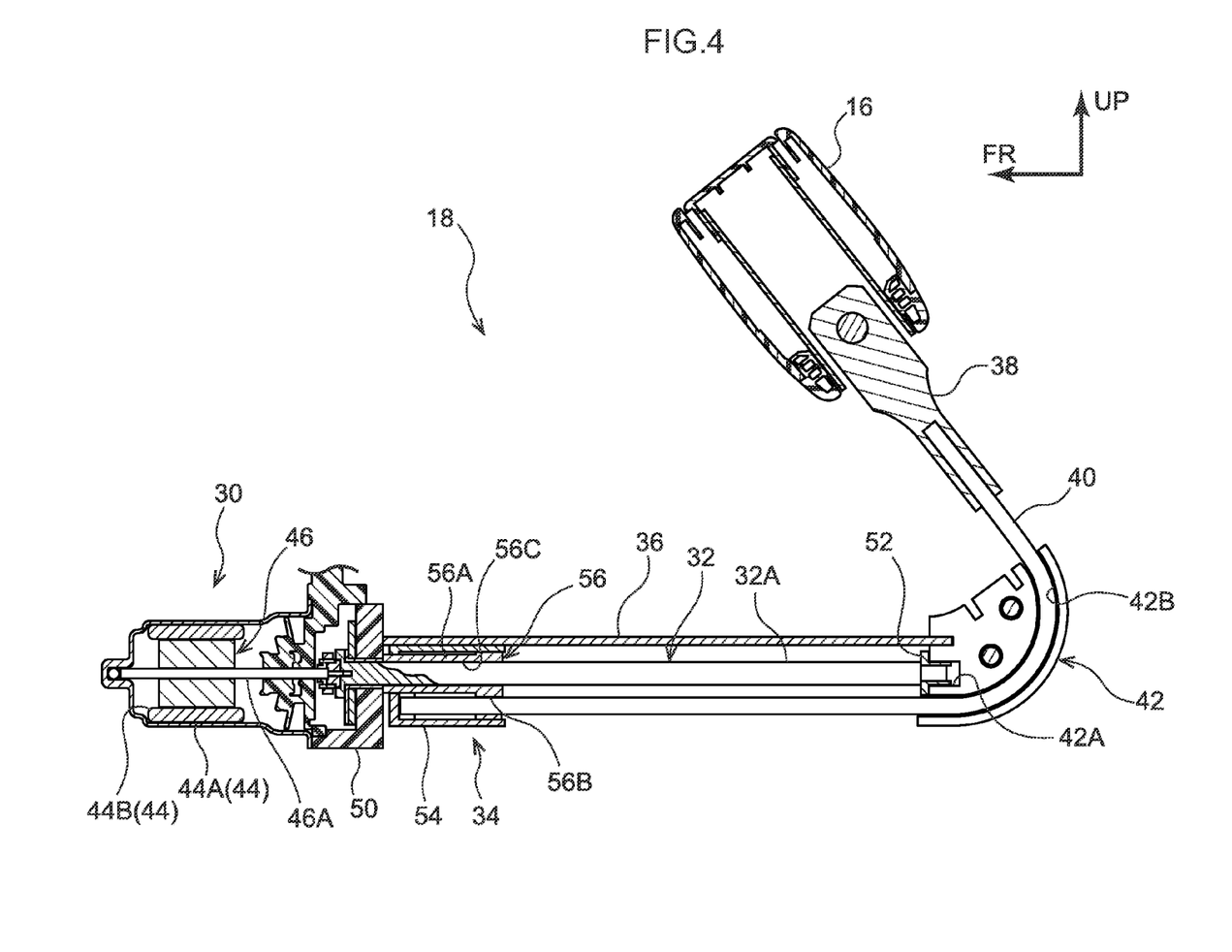
FIG. 4 is a side cross-section view illustrating a lift-up device.

As illustrated in FIG. 3 and FIG. 4, the lift-up device 18 includes a motor 30 capable of rotating toward one axial line direction side and the other axial line direction side, a shaft 32 attached to an output shaft 46A of the motor 30 so as to be rotatable together with the output shaft 46A, a slider 34 that moves along the axial direction of the shaft 32 accompanying rotation of the shaft 32, a rail 36 that guides the slider 34, the wire 40, serving as a coupling portion, with one end portion fixed to the slider 34 and the other end portion fixed to the buckle 16 through the joint piece 38, and a wire guide 42 that guides the wire 40.

As illustrated in FIG. 4, the motor 30 is a DC motor, and the motor 30 is fixed to a fastening member 50 to the seat cushion frame 28 by screws 48 (see FIG. 3).

The shaft 32 is formed in a rod shape using a steel material or the like, and a male thread 32A is formed along the length direction at an outer peripheral portion of the shaft 32. As previously described, one end portion of the shaft 32 is fixed to the output shaft 46A of the motor 30, and the shaft 32 is accordingly rotated by the motor 30. The shaft 32 is also inserted through the fastening member 50 and disposed inside the rail 36, and the other end portion of the shaft 32 is axially supported by an axial support hole 42A formed to the wire guide 42, described later.

The slider 34 is configured including a guide block 54 formed in a rectangular shape, and a slider main body 56 attached to the guide block 54. The external profile of the guide block 54 is formed in a shape corresponding to the shape of the inside of the rail 36, such that the guide block 54 is capable of moving along the rail 36. The slider main body 56 is configured including a cylinder shaped portion 56A that is formed in a cylindrical shape and through which the shaft 32 is inserted, and a wire fixing portion 56B provided to one end side of the cylinder shaped portion 56A. A female thread 56C, that screws together with the male thread 32A formed to the outer peripheral portion of the shaft 32, is formed to an inner peripheral portion of the cylinder shaped portion 56A. Thus, on rotation of the shaft 32, the slider main body 56 moves together with the guide block 54 along the shaft 32 and the rail 36, namely, the slider 34 moves along the shaft 32 and the rail 36. The one end portion of the wire 40 is fixed to the wire fixing portion 56B by crimping or the like.

The rail 36 is formed, for example, by pressing a sheet steel material, and the fastening member 50 is fixed to one end portion of the rail 36 by screws. A fastening member 60 to the wire guide 42 and the seat cushion frame 28 is fixed by screws 62 (see FIG. 3) to the other end portion of the rail 36.

The wire guide 42 is formed in a block shape that is substantially fan shaped in side view. The wire guide 42 is formed with the axial support hole 42A previously described, and a guide groove 42B that guides the wire 40. The wire 40 is curved in a U shape in side view due to disposing the wire 40 inside the guide groove 42B. Note that in the present exemplary embodiment, an open end of the guide groove 42B formed to the wire guide 42 is closed off by the fastening member 60 (see FIG. 3), such that the wire 40 does not come out of the guide groove 42B.

(First Cover 20)

Figure 5:
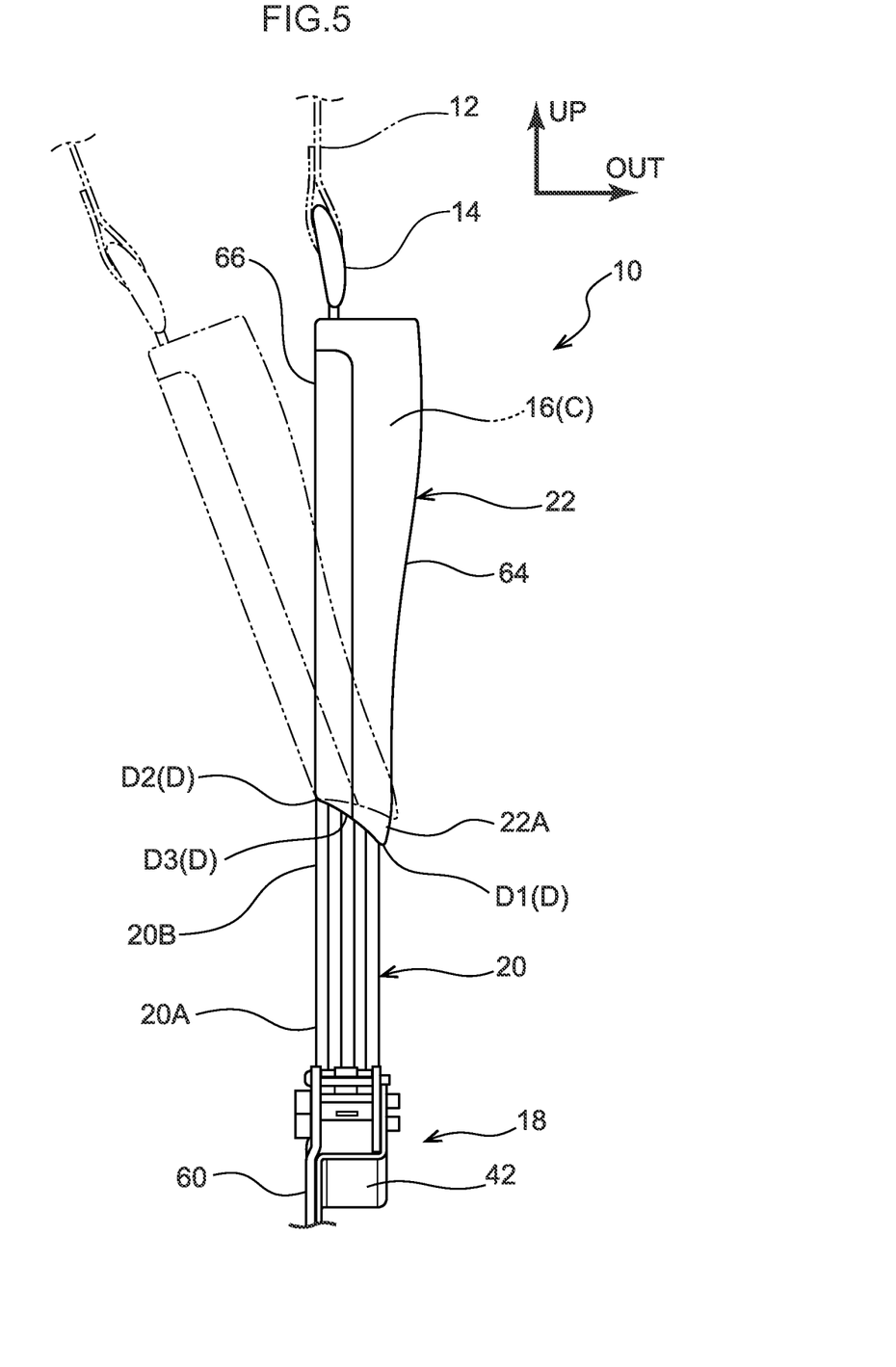
FIG. 5 is a back view illustrating a lift-up buckle device viewed from a seat rear side.
Figure 6:
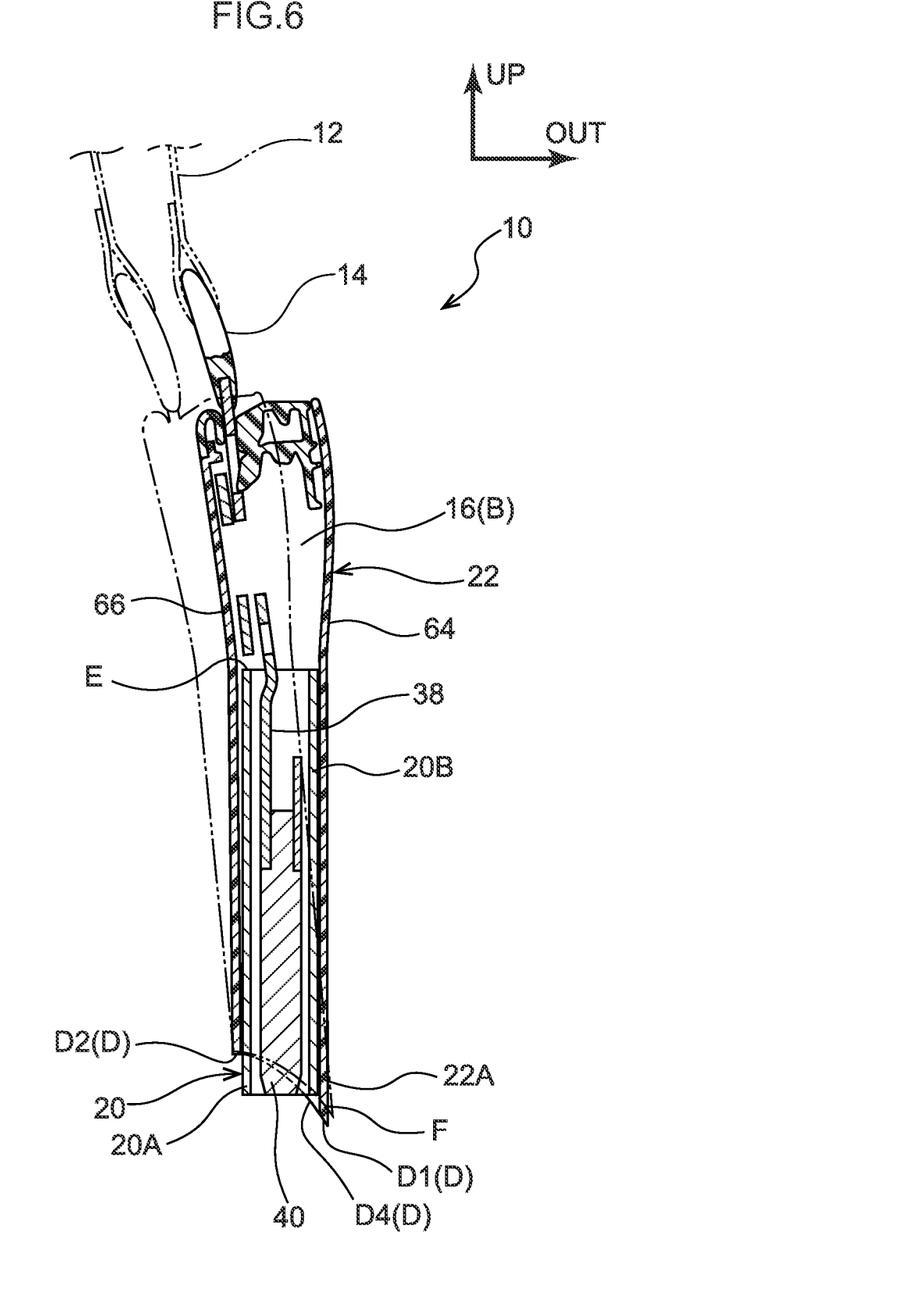
FIG. 6 is a cross-section illustrating a cross-section of the lift-up buckle device taken along the line A-A illustrated in FIG. 1, illustrating a state in which a buckle is positioned in a stowed position.
Figure 7:
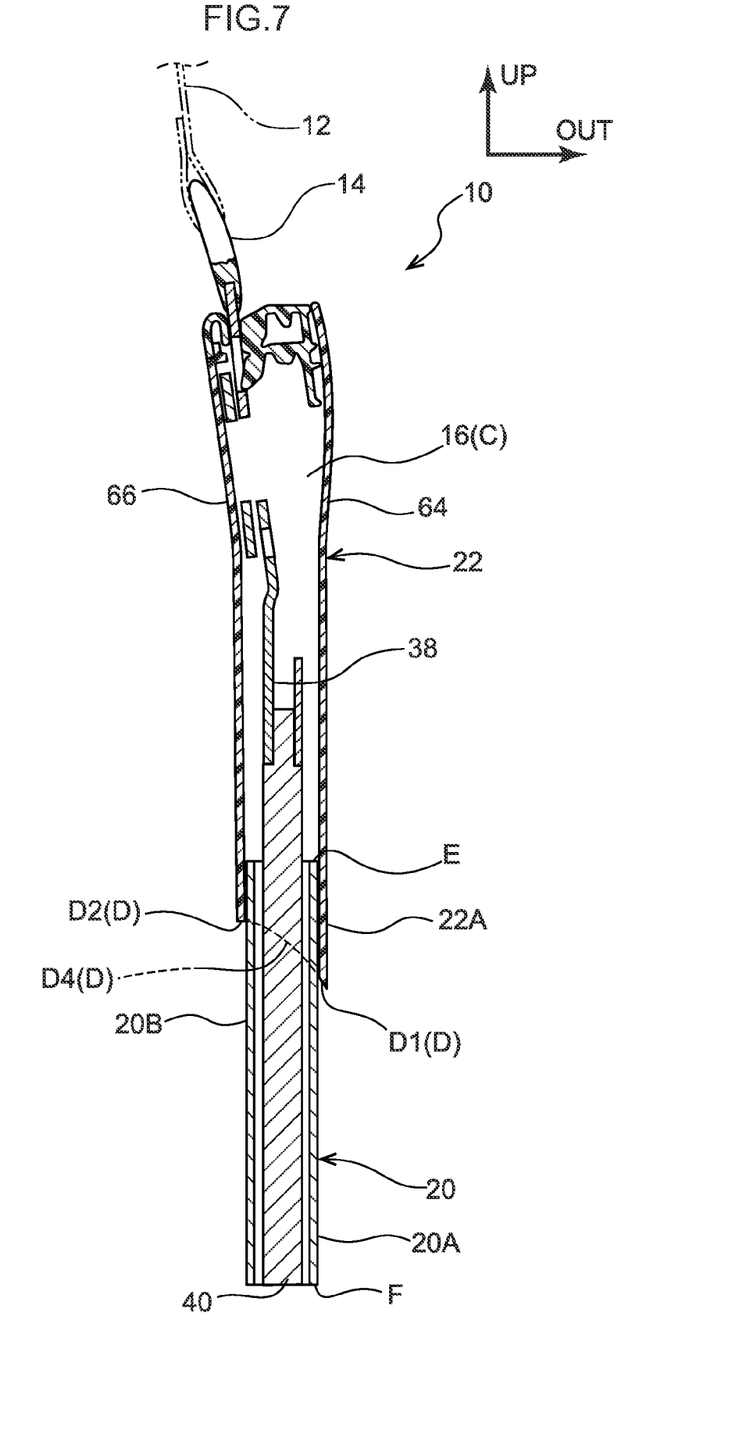
FIG. 7 is a cross-section illustrating a cross-section of the lift-up buckle device illustrated in FIG. 1 taken along the line A-A, illustrating a state in which the buckle is positioned in a raised position.

As illustrated in FIG. 5 to FIG. 7, as an example, the first cover 20 is formed in a tube shape using a resilient material such as rubber. The wire 40 is inserted through the first cover 20, namely, the wire 40 is covered by the first cover 20. The rigidity of a seat lower side location 20A of the first cover 20 is set lower than the rigidity of a seat upper side location 20B of the first cover 20. In the present exemplary embodiment as an example, the rigidity of the seat lower side location 20A of the first cover 20 is set lower than the rigidity of the seat upper side location 20B at the seat upper side of the first cover 20 by plural ribs projecting out at the inside of the seat upper side location 20B. Note that the rigidity of the seat lower side location 20A and the seat upper side location 20B of the first cover 20 may be set as described above by another method, such as adjusting the thickness of the seat lower side location 20A and the seat upper side location 20B. The wire guide 42 is fixed to a lower end portion of the first cover 20.

(Second Cover 22)

As an example, the second cover 22 is formed using a harder resin material than the first cover 20, and the second cover 22 configures a buckle cover covering the buckle 16. Specifically, the second cover 22 is formed in a tube shape by joining together an outer cover 64 disposed at the seat width direction outside, and an inner cover 66 disposed at the vehicle width direction inside. The first cover 20 is inserted into the second cover 22, such that the second cover 22 is capable of sliding along the first cover 20 (forming a telescopic structure). Note the second cover 22 may be formed as an integral structure rather than the divided structure described above.

As illustrated in FIG. 5 and FIG. 7, in the second cover 22, in a state in which the buckle 16 is positioned in the raised position C, a seat lower side end D of the second cover 22 is positioned further to the seat lower side than a seat upper side end E of the first cover 20 (is positioned toward the side of the wire guide 42 configuring a portion of the lift-up device 18). Furthermore, an end D1 of the second cover 22 on the seat width direction outside and seat lower side is positioned further to the seat lower side than an end D2 of the second cover 22 on the seat width direction inside and seat lower side (is positioned on the wire guide 42 side). In the present exemplary embodiment, in the state in which the buckle 16 is positioned in the raised position C, and in a state in which external force from an occupant is not input to the buckle 16, the end D1 of the second cover 22 on the seat width direction outside and seat lower side is substantially aligned with an upper edge 26A (see FIG. 2) of the seat cushion 26 (a side support portion) in a seat side view.

Figure 8:
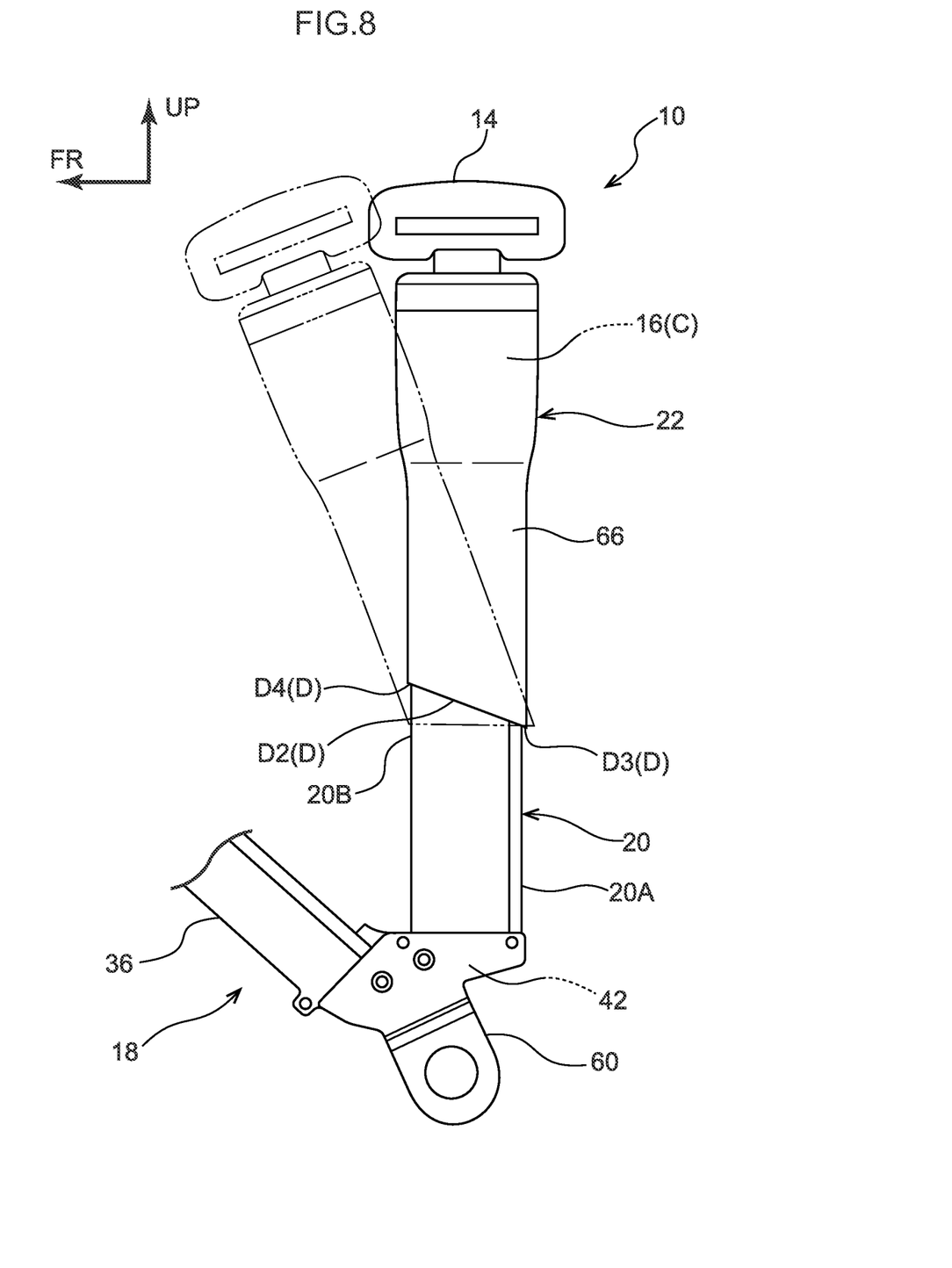
FIG. 8 is side view illustrating a lift-up buckle device viewed from a seat width direction outside.

As illustrated in FIG. 8, in the state in which the buckle 16 is positioned in the raised position C, an end D3 of the second cover 22 on the seat rear side and seat lower side is positioned further to the seat lower side than an end D4 of the second cover 22 on the seat front side and seat lower side (is positioned on the wire guide 42 side). Furthermore, as illustrated in FIG. 7, the end D3 of the second cover 22 on the seat rear side and seat lower side slopes toward the seat lower side on progression toward the seat width direction outside.

As illustrated in FIG. 6, in a state in which the buckle 16 is positioned in the stowed position B, an end portion 22A of the second cover 22 on the seat width direction outside and seat lower side and an end F of the first cover 20 on the seat width direction outside and seat lower side overlap each other in the seat width direction. Namely, in the state in which the buckle 16 is positioned in the stowed position B, the end portion 22A of the second cover 22 on the seat width direction outside and seat lower side covers the end F of the first cover 20 on the seat width direction outside and seat lower side.

Operation and Advantageous Effects of Present Exemplary Embodiment

Explanation follows regarding operation and advantageous effects of the present exemplary embodiment.

As illustrated in FIG. 2 and FIG. 4, in the present exemplary embodiment, the motor 30 of the lift-up device 18 rotates the shaft 32 on detection that an occupant is sitting on the seat cushion 26. The slider 34 moves together with the wire 40 along the shaft 32 due to the rotation of the shaft 32, and the buckle 16 fixed to the other end portion of the wire 40 moves toward the seat upper side. The occupant can thereby easily engage the tongue 14 with the buckle 16. Namely, the occupant can easily put on the webbing 12.

As illustrated in FIG. 6 and FIG. 7, in the present exemplary embodiment, the second cover 22, into which the first cover 20 is inserted, moves together with the buckle 16 when the lift-up device 18 operates. In the state in which the buckle 16 is positioned in the raised position C, the seat lower side end D of the second cover 22 is positioned further to the seat lower side than the seat upper side end E of the first cover 20. This enables the wire 40 to be suppressed from being visible between the first cover 20 and the second cover 22.

As illustrated in FIG. 5, since the end D1 of the second cover 22 on the seat width direction outside and seat lower side is positioned further to the seat lower side than the end D2 of the second cover 22 on the seat width direction inside and seat lower side, the second cover 22 is suppressed from coming away from the first cover 20 if the occupant tilts the buckle 16 toward the seat width direction inside (the first cover 20 is suppressed from coming out of the second cover 22). Namely, the present lift-up buckle device 10 enables the wire 40 to be suppressed from being visible between the first cover 20 and the second cover 22 if the occupant tilts the buckle 16 toward the seat width direction inside. This enables a detrimental effect on the appearance of the lift-up buckle device 10 to be suppressed.

As illustrated in FIG. 8, in the present exemplary embodiment, in the state in which the buckle 16 is positioned in the raised position C, the end D3 of the second cover 22 on the seat rear side and seat lower side is positioned further to the seat lower side than the end D4 of the second cover 22 on the seat front side and seat lower side. Thus the second cover 22 is suppressed from coming away from the first cover 20 if the occupant tilts the buckle 16 toward the seat front side (the first cover 20 is suppressed from coming out of the second cover 22). Namely, in the present exemplary embodiment, the wire 40 is suppressed from being visible between the first cover 20 and the second cover 22 if the occupant tilts the buckle 16 toward the seat front side, and thereby enables a detrimental effect on the appearance of the lift-up buckle device 10 to be further suppressed.

In the present exemplary embodiment, in the state in which the buckle 16 is positioned in the stowed position B, the end portion 22A of the second cover 22 on the seat width direction outside and seat lower side covers the end F of the first cover 20 on the seat width direction outside and seat lower side. This enables a boundary portion between the first cover 20 and the lift-up device 18 (a join portion between the first cover 20 and the wire guide 42) to be suppressed from being visible from the seat width direction outside.

Further, in the present exemplary embodiment, setting the rigidity of the seat lower side location 20A of the first cover 20 lower than the rigidity of the seat upper side location 20B of the first cover 20 enables the first cover 20 to be both self-supporting and flexible.

Note that, although in the present exemplary embodiment an example has been explained in which the rigidity of the seat lower side location 20A of the first cover 20 is set lower than the rigidity of the seat upper side location 20B of the first cover 20, the present invention is not limited thereto. The rigidity of each portion of the first cover 20 may be set as appropriate in consideration of such factors as the displacement amount of the buckle 16 when the occupant touches the buckle 16.

Moreover, although in the present exemplary embodiment an example has been explained in which, in the state in which the buckle 16 is positioned in the stowed position B, the end portion 22A of the second cover 22 on the seat width direction outside and seat lower side covers the end F of the first cover 20 on the seat width direction outside and seat lower side, the present invention is not limited thereto. For example, in cases in which the boundary portion between the first cover 20 and the lift-up device 18 is covered by another component disposed inside the cabin, configuration may be applied in which the end portion 22A of the second cover 22 on the seat width direction outside and seat lower side does not cover the end F of the first cover 20 on the seat width direction outside and seat lower side.

Furthermore, although in the present exemplary embodiment an example has been explained in which, in the state in which the buckle 16 is positioned in the raised position C, the end D3 of the second cover 22 on the seat rear side and seat lower side is positioned further to the seat lower side than the end D4 of the second cover 22 on the seat front side and seat lower side, the present invention is not limited thereto. For example, in cases in which the layout is such that there is little possibility of the occupant tilting the buckle 16 toward the seat front side, the positional relationship between the end D3 of the second cover 22 on the seat rear side and seat lower side and the end D4 of the second cover 22 on the seat front side and seat lower side may be set differently from that described above.

Figure 9:
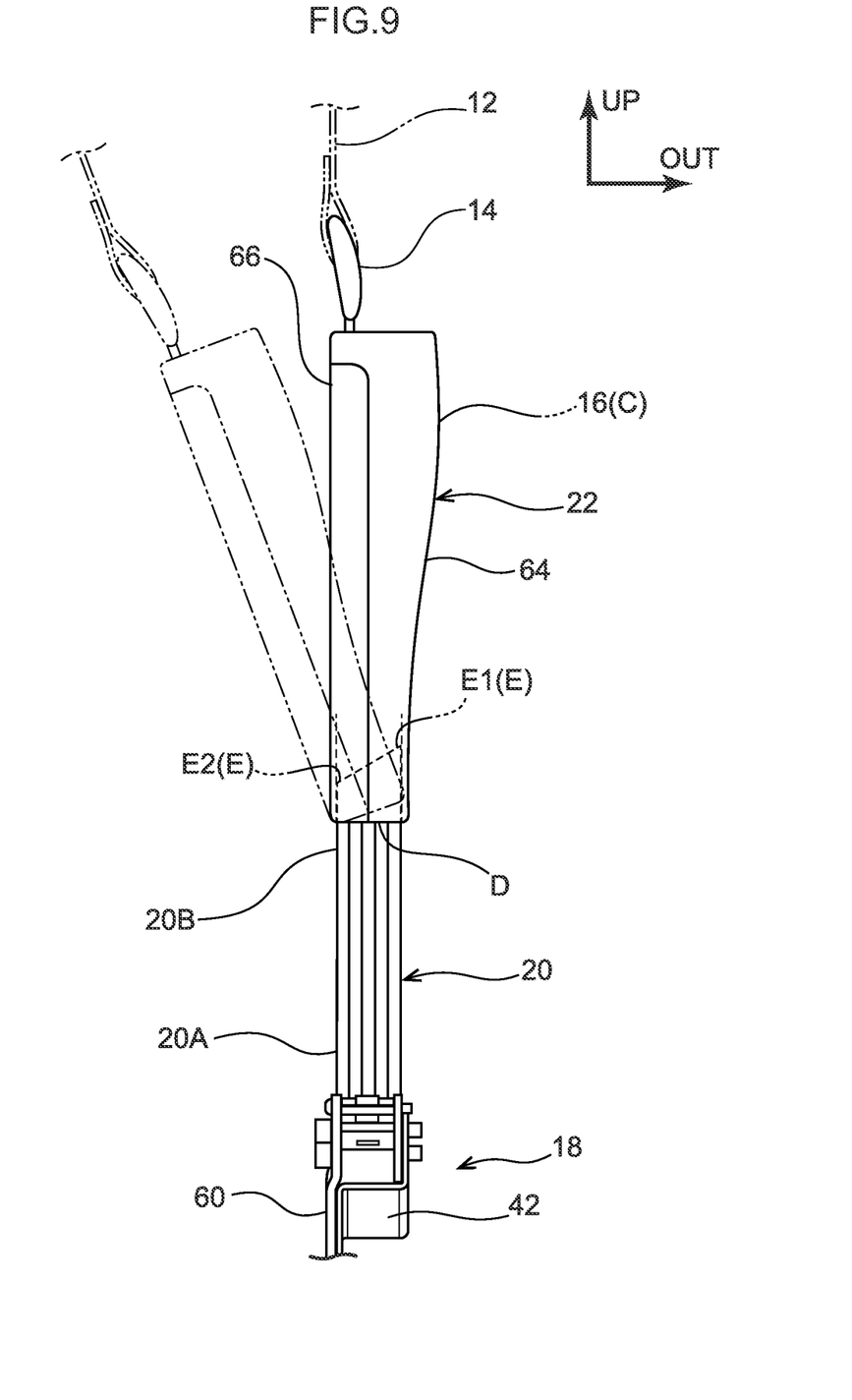
FIG. 9 is a back view corresponding to FIG. 5, illustrating a first cover and a second cover according to a modified example.

Furthermore, although in the present exemplary embodiment an example has been explained in which the end D1 of the second cover 22 on the seat width direction outside and seat lower side is positioned further to the seat lower side than the end D2 of the second cover 22 on the seat width direction inside and seat lower side, thereby suppressing the second cover 22 from coming away from the first cover 20 if the occupant tilts the buckle 16 toward the seat width direction inside, the present invention is not limited thereto. For example, as illustrated in FIG. 9, a configuration may be applied in which an end E1 of the first cover 20 on the seat width direction outside and seat upper side is positioned further to the buckle 16 side than an end E2 of the first cover 20 on the seat width direction inside and seat upper side, thereby suppressing the second cover 22 from coming away from the first cover 20 if the occupant tilts the buckle 16 toward the seat width direction inside.

Figure 10:
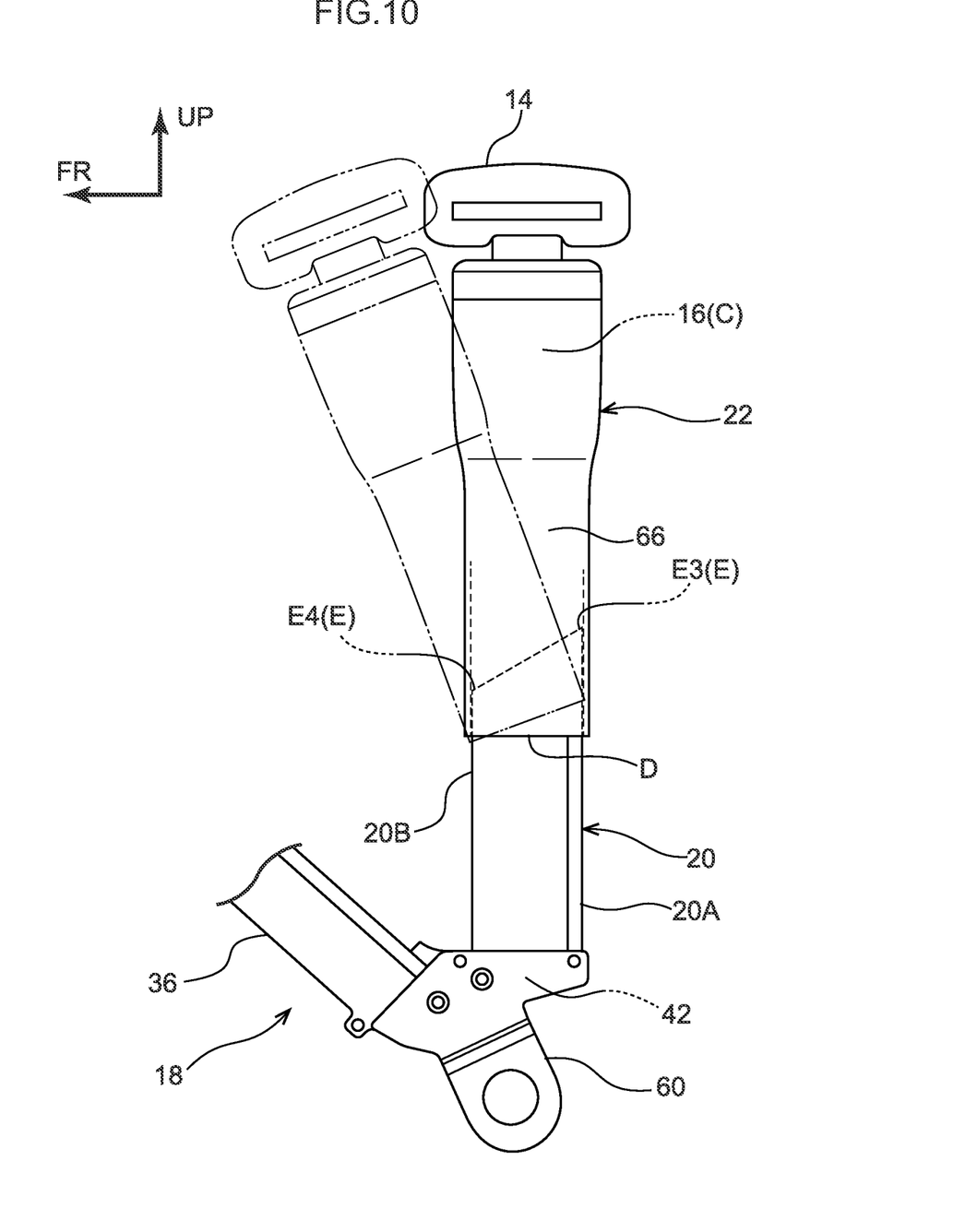
FIG. 10 is a side view corresponding to FIG. 8, illustrating a first cover and a second cover according to a modified example.

Furthermore, although in the present exemplary embodiment an example has been explained in which the end D3 of the second cover 22 on the seat rear side and seat lower side is positioned further to the seat lower side than the end D4 of the second cover 22 on the seat front side and seat lower side, thereby suppressing the second cover 22 from coming away from the first cover 20 if the occupant tilts the buckle 16 toward the seat front side, the present invention is not limited thereto. For example, as illustrated in FIG. 10, a configuration may be applied in which an end E3 of the first cover 20 on the seat rear side and seat upper side is positioned further to the buckle 16 side than an end E4 of the first cover 20 on the seat front side and seat upper side, thereby suppressing the second cover 22 from coming away from the first cover 20 if the occupant tilts the buckle 16 toward the seat front side.

Although an exemplary embodiment of the present invention has been explained above, the present invention is not limited thereto, and obviously various other modifications may be implemented with a range not departing from the spirit of the invention.

What is claimed is:

1. A lift-up buckle device for use with a passenger seat in a vehicle, the lift-up buckle device having an inner-side configured to face the passenger seat, an outer-side configured to face away from the passenger seat, a lower-side arranged near a floor of the vehicle, an upper-side arranged opposite to the lower-side so as to be accessible from the vehicle seat, a forward-side configured to be arranged toward a front of the vehicle, and a rearward-side configured to be arranged toward a rear of the vehicle, the lift-up buckle device comprising:
  a buckle arranged at the upper-side of the lift-up buckle device, the buckle being configured to engage with a tongue inserted with webbing worn by a passenger seated in the passenger seat;
  a lift-up device arranged at the lower-side of the lift-up buckle device, the lift-up device configured with a coupling portion coupled to the buckle and configured to move the buckle from a stowed position nearer to the lower-side of the lift-up buckle device, to a raised position away from the lower-side of the lift-up buckle device;
  a first cover that is fixed to the lift-up device and configured to cover the coupling portion; and
  a second cover oriented at least partially over the first cover, and configured to move together with the buckle from the stowed position to the raised position by sliding with respect to the first cover, wherein
  when the buckle is in the raised position, a lower-end of the second cover is positioned closer to the lower-side than an upper-end of the first cover, and
  an outer-lower-end of the second cover is closer to the lower-side than the inner-lower-end of the second cover.

2. The lift-up buckle device of claim 1, wherein when the buckle is in the raised position, a rearward-lower-end of the second cover is positioned closer to the lower-side of the lift-up buckle device than a forward-lower-end of the second cover.

3. The lift-up buckle device of claim 1, wherein in a state in which the buckle is positioned in the stowed position, an outer-lower-portion of the second cover and an outer-lower-end of the first cover overlap with each other in a direction toward the outer-side.

4. The lift-up buckle device of claim 1, wherein a rigidity of a lower-side of the first cover is set lower than a rigidity of an upper-side of the first cover.

5. A lift-up buckle device for use with a passenger seat in a vehicle, the lift-up buckle device having an inner-side configured to face the passenger seat, an outer-side configured to face away from the passenger seat, a lower-side arranged near a floor of the vehicle, an upper-side arranged opposite to the lower-side so as to be accessible from the vehicle seat, a forward-side configured to be arranged toward a front of the vehicle, and a rearward-side configured to be arranged toward a rear of the vehicle, the lift-up buckle device comprising:
  a buckle arranged at the upper-side of the lift-up buckle device, the buckle being configured to engage with a tongue inserted with webbing worn by a passenger seated in the passenger seat;
  a lift-up device arranged at the lower-side of the lift-up buckle device, the lift-up device configured with a coupling portion coupled to the buckle and configured to move the buckle from a stowed position nearer to the lower-side of the lift-up buckle device, to a raised position away from the lower-side of the lift-up buckle device;
  a first cover that is fixed to the lift-up device and configured to cover the coupling portion, wherein an outer-upper-end of the first cover is closer to the upper-side of the buckle device than an inner-upper-end of the first cover; and
  a second cover oriented at least partially over the first cover, and configured to move together with the buckle from the stowed position to the raised position by sliding with respect to the first cover, wherein
  when the buckle is in the raised position, a lower-end of the second cover is positioned closer to the lower-side than an upper-end of the first cover.

6. The lift-up buckle device of claim 5, wherein a rearward-upper-side of the first cover is positioned further toward the upper-side of the lift-up buckle device than a forward-upper-side of the first cover.

* * * * *